United States Patent
Wang et al.

(10) Patent No.: US 10,802,522 B2
(45) Date of Patent: Oct. 13, 2020

(54) OUTPUT VOLTAGE REGULATION APPARATUS AND METHOD

(71) Applicant: Huawei Technologies Co., Ltd., Shenzhen (CN)

(72) Inventors: Jiake Wang, Shenzhen (CN); Liang Chen, Shenzhen (CN); Peng Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/439,934

(22) Filed: Jun. 13, 2019

(65) Prior Publication Data

US 2019/0294191 A1   Sep. 26, 2019

Related U.S. Application Data

(63) Continuation of application No. PCT/CN2017/098143, filed on Aug. 18, 2017.

(30) Foreign Application Priority Data

Feb. 15, 2017   (CN) .......................... 2017 1 0081704

(51) Int. Cl.
  *G05F 1/56*   (2006.01)
  *G05F 1/575*   (2006.01)
  (Continued)

(52) U.S. Cl.
  CPC .............. *G05F 1/575* (2013.01); *G05F 1/561* (2013.01); *H02M 3/157* (2013.01); *H02M 2001/0025* (2013.01)

(58) Field of Classification Search
  CPC ... G05F 1/46; G05F 1/56; G05F 1/561; G05F 1/562; G05F 1/563; G05F 1/565;
  (Continued)

(56) References Cited

U.S. PATENT DOCUMENTS 6,665,338 B1   12/2003   Midya et al.
8,754,617 B2 *   6/2014   Tang ................. H02M 3/33523
                                                                  323/221

(Continued)

FOREIGN PATENT DOCUMENTS

CN           102566635 A     7/2012
CN           103151829 A     6/2013
(Continued)

OTHER PUBLICATIONS

Machine Translation and Abstract of Chinese Publication No. CN103151829, Jun. 12, 2013, 34 pages.
(Continued)

*Primary Examiner* — Adolf D Berhane
(74) *Attorney, Agent, or Firm* — Conley Rose, P.C.

(57) ABSTRACT

An output voltage regulation apparatus includes a voltage regulation circuit, a control circuit, a power stage circuit, a filtering network, and a feedback network. The feedback network is configured to output a feedback voltage to a feedback voltage node of the control circuit. The voltage regulation circuit is configured to regulate the feedback voltage. The control circuit is configured to switch on or off power transistors in the power stage circuit. The filtering network is configured to perform filtering on an output voltage of the power stage circuit to obtain the regulated output voltage.

20 Claims, 4 Drawing Sheets

(51) Int. Cl.
*H02M 3/157* (2006.01)
*H02M 1/00* (2006.01)

(58) Field of Classification Search
CPC ........ G05F 1/569; G05F 1/575; H02M 3/155; H02M 3/156; H02M 3/157; H02M 2001/0025
See application file for complete search history.

(56) References Cited

U.S. PATENT DOCUMENTS

| | | | |
|---|---|---|---|
| 10,298,114 B1* | 5/2019 | Yazdi | .................. H02M 1/15 |
| 2003/0151453 A1 | 8/2003 | Laletin | |
| 2010/0066331 A1 | 3/2010 | Chang et al. | |
| 2012/0155123 A1 | 6/2012 | Tang et al. | |
| 2014/0253073 A1 | 9/2014 | Moon et al. | |
| 2015/0137785 A1 | 5/2015 | Stevens | |
| 2017/0207723 A1* | 7/2017 | Zhang | ............. H02M 3/1584 |

FOREIGN PATENT DOCUMENTS

| | | |
|---|---|---|
| CN | 103296887 A | 9/2013 |
| CN | 105356729 A | 2/2016 |
| CN | 106774585 A | 5/2017 |
| JP | 2016226190 A | 12/2016 |

OTHER PUBLICATIONS

Machine Translation and Abstract of Chinese Publication No. CN103296887, Sep. 11, 2013, 20 pages.
Machine Translation and Abstract of Chinese Publication No. CN105356729, Feb. 24, 2016, 15 pages.
Machine Translation and Abstract of Chinese Publication No. CN106774585, May 31, 2017, 16 pages.
Machine Translation and Abstract of Japanese Publication No. JP2016226190, Dec. 28, 2016, 31 pages.
Foreign Communication From a Counterpart Application, Chinese Application No. 201710081704.X, Chinese Office Action dated Sep. 29, 2017, 6 pages.
Foreign Communication From a Counterpart Application, PCT Application No. PCT/CN2017/098143, English Translation of International Search Report dated Oct. 27, 2017, 2 pages.
Foreign Communication From a Counterpart Application, European Application No. 17897008.3, Extended European Search Report dated Oct. 16, 2019, 7 pages.

* cited by examiner

OUTPUT VOLTAGE REGULATION APPARATUS AND METHOD

CROSS-REFERENCE TO RELATED APPLICATIONS

This application is a continuation of International Application No. PCT/CN2017/098143, filed on Aug. 18, 2017, which claims priority to Chinese Patent Application No. 201710081704.X, filed on Feb. 15, 2017, both of which are hereby incorporated by reference in their entireties.

TECHNICAL FIELD

Embodiments of this application relate to the field of power management, and in particular, to an output voltage regulation apparatus and method.

BACKGROUND

In recent years, consumer electronics such as smartphones and tablet computers show a trend of rapid development. A power management integrated circuit (PMIC) is a power device for managing host systems of the consumer electronics, and the PMIC has advantages such as high integration, high conversion efficiency, and low costs. An integrated voltage regulator (IVR) is an important component of the PMIC. With rapid generational shift of the consumer electronics, the consumer electronics have higher requirements on performance of the IVR. To reduce system power consumption, an output voltage of the IVR needs to be dynamically and rapidly regulated in real time based on post-stage load.

The output voltage is usually rapidly regulated by rapidly regulating a reference voltage or a value of a feedback resistor. However, these solutions usually cause an overshoot, an undershoot, or a glitch of the output voltage. For example, as shown in FIG. 1, FIG. 1 shows a waveform when the output voltage is rapidly regulated by rapidly regulating the reference voltage. When a reference voltage $V_{REF}$ jumps from $V_{REF1}$ to $V_{REF2}$ after duration $t_{ramp}$, an output voltage $V_O$ also rapidly increases from $V_{O1}$. However, a waveform of $V_O$ usually experiences an overshoot, that is, $\Delta V$ marked in FIG. 1. After a recovery time $t_{setting}$, $V_O$ is stabilized at a target value $V_{O2}$. In addition, shorter duration $t_{ramp}$ indicates a larger overshoot $\Delta V$ and a longer recovery time $t_{setting}$. On the contrary, when $V_{REF}$ jumps downwards, $V_O$ also experiences a corresponding undershoot, and can reach a stable value only after a recovery time after the undershoot.

In conclusion, the solution of rapidly regulating the output voltage of the IVR is likely to cause the overshoot, the undershoot, or the glitch of the output voltage, and the recovery time of the overshoot or the undershoot is very long, affecting system performance to some degree.

SUMMARY

Embodiments of this application provide an output voltage regulation apparatus and method, to implement rapid voltage regulation, and to resolve a problem that an overshoot or an undershoot occurs in an output voltage regulation process.

Specific technical solutions provided in the embodiments of this application are as follows.

According to a first aspect, an output voltage regulation apparatus is provided. A voltage regulation circuit is added into the output voltage regulation apparatus. On a basis of maintaining a reference voltage $V_{REF}$ in a control circuit unchanged, a current of a feedback voltage $V_{FB}$ node in the control circuit is changed using the voltage regulation circuit, to rapidly regulate an output voltage $V_O$. In this way, not only rapid regulation of the output voltage can be implemented, but also an overshoot, an undershoot, or a glitch that occurs in an output voltage regulation process can be inhibited, and a time of regulating the output voltage to a regulated voltage is effectively shortened.

In a possible design, the apparatus includes the voltage regulation circuit, the control circuit, a power stage circuit, a filtering network, and a feedback network, where the voltage regulation circuit, the control circuit, the power stage circuit, the filtering network, and the feedback network form a loop, an input end of the feedback network is connected to an output end of the filtering network and is configured to acquire an output voltage $V_O$ of the filtering network, and an output end of the feedback network is connected to a feedback voltage node of the control circuit and is configured to output a feedback voltage to the feedback voltage node of the control circuit, an output end of the voltage regulation circuit is connected between the output end of the feedback network and the feedback voltage node of the control circuit and is configured to regulate a current I of the feedback voltage node, an output end of the control circuit is connected to an input end of the power stage circuit and is configured to regulate an output duty cycle of the power stage circuit based on the current I of the feedback voltage node, and an input end of the filtering network is connected to an output end of the power stage circuit and is configured to perform filtering on the output duty cycle of the power stage circuit, to obtain a regulated output voltage $V_O$. The output voltage $V_O$ is rapidly regulated by regulating the current of the feedback node, providing an excellent inhibition effect on an overshoot or an undershoot of the output voltage such that a voltage regulation effect is more rapidly and stably achieved.

In a possible design, the voltage regulation circuit includes a digital-to-analog conversion circuit and a voltage-to-current conversion circuit, the digital-to-analog conversion circuit is configured to receive a digital signal used to represent voltage regulation, generate a first reference voltage signal based on the digital signal, and transmit the first reference voltage signal to the voltage-to-current conversion circuit, and the voltage-to-current conversion circuit is configured to receive the first reference voltage signal, convert the first reference voltage signal to a current regulation signal, and transmit the current regulation signal to the feedback voltage node.

In a possible design, the voltage regulation circuit is further configured to inject a current to the feedback voltage node or receive a current flowing out of the feedback voltage node, based on the current regulation signal.

In a possible design, the feedback network includes a first feedback resistor $R_{f1}$ and a second feedback resistor $R_{f2}$, and an output point of the feedback network is located between the first feedback resistor and the second feedback resistor, and the output voltage $V_O$ and the current I of the feedback voltage node satisfy the following relationship, $V_O = V_{REF}*(1+R_{f1}/R_{f2})+I*R_{f1}$, where $V_{REF}$ is a second reference voltage signal obtained by the control circuit.

According to a second aspect, an output voltage regulation method is provided. On a basis of maintaining a reference voltage $V_{REF}$ in a control circuit unchanged, a current of a feedback voltage $V_{FB}$ node in the control circuit is changed, to rapidly regulate an output voltage $V_O$. In this way, not only rapid regulation of the output voltage can be implemented, but also an overshoot, an undershoot, or a glitch that occurs in an output voltage regulation process can be inhibited, and a time of regulating the output voltage to a regulated voltage is effectively shortened.

In a possible design, an output voltage $V_O$ of a filtering network is acquired and a feedback voltage is output to a feedback voltage node of the control circuit using a feedback network, a current I of the feedback voltage node is regulated using a voltage regulation circuit, an output duty cycle of the power stage circuit is regulated based on the current I of the feedback voltage node using the control circuit, and filtering is performed on the output duty cycle of the power stage circuit using the filtering network, to obtain a regulated output voltage $V_O$. The output voltage $V_O$ is rapidly regulated by regulating the current of the feedback node, providing an excellent inhibition effect on an overshoot, an undershoot, or a glitch of the output voltage such that a voltage regulation effect is more rapidly and stably achieved.

In a possible design, the regulating a current I of the feedback voltage node using a voltage regulation circuit is receiving a digital signal used to represent voltage regulation, generating a first reference voltage signal based on the digital signal, converting the first reference voltage signal to a current regulation signal, and transmitting the current regulation signal to the feedback voltage node.

In a possible design, the regulating a current I of the feedback voltage node using a voltage regulation circuit is injecting a current to the feedback voltage node or receiving a current flowing out of the feedback voltage node, based on the current regulation signal.

In a possible design, the output voltage $V_O$ and the current I of the feedback voltage node satisfy the following relationship, $V_O=V_{REF}*(1+R_{f1}/R_{f2})+I*R_{f1}$, where $V_{REF}$ is a second reference voltage signal obtained by the control circuit, $R_{f1}$ is a first feedback resistor in the feedback network, $R_{f2}$ is a second feedback resistor in the feedback network, and an output point of the feedback network is located between the first feedback resistor and the second feedback resistor.

According to a third aspect, a power supply is provided. The power supply includes the output voltage regulation apparatus according to the first aspect or any possible design of the first aspect.

DESCRIPTION OF EMBODIMENTS

The following describes in detail the embodiments of this application with reference to accompanying drawings.

A basic concept of a voltage regulation solution in the embodiments of this application is the following. A voltage regulation circuit is added into an output voltage regulation apparatus. On a basis of maintaining a reference voltage $V_{REF}$ in a control circuit unchanged, a current of a feedback voltage $V_{FB}$ node in the control circuit is changed using the voltage regulation circuit, to rapidly regulate an output voltage $V_O$. In this way, not only rapid regulation of the output voltage can be implemented, but also an overshoot, an undershoot, or a glitch that occurs in an output voltage regulation process can be inhibited, and a time of regulating the output voltage to a regulated voltage is effectively shortened.

The embodiments of this application may be applied to a rapid voltage regulation device related to a direct current (DC) to DC converter (DC to DC Converter or DC-DC) or a rapid voltage regulation device related to an alternating current (AC) to DC converter (AC to DC Converter or AC-DC). The output voltage regulation apparatus in the embodiments of this application may be an IVR, or any apparatus that can rapidly regulate an output voltage by applying a method of the embodiments of this application.

An output voltage regulation apparatus and method provided in the embodiments of this application are described in detail below.

Figure 1:
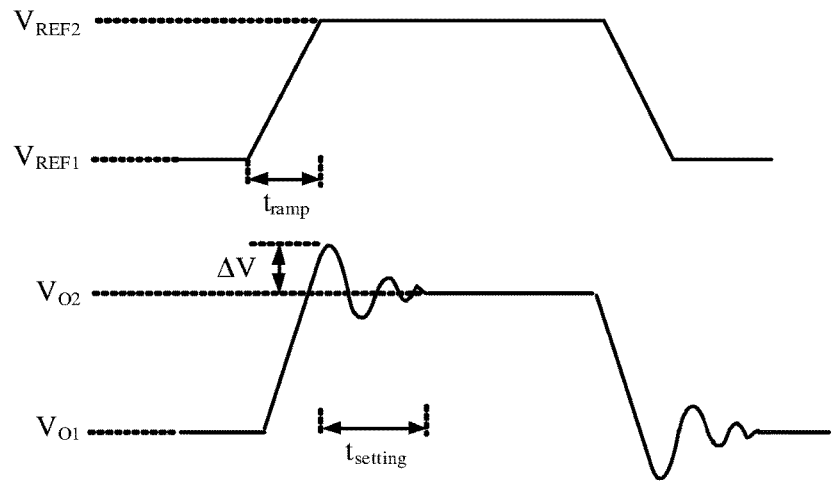
FIG. 1 is a schematic diagram of a waveform when an output voltage is rapidly regulated.
Figure 2:
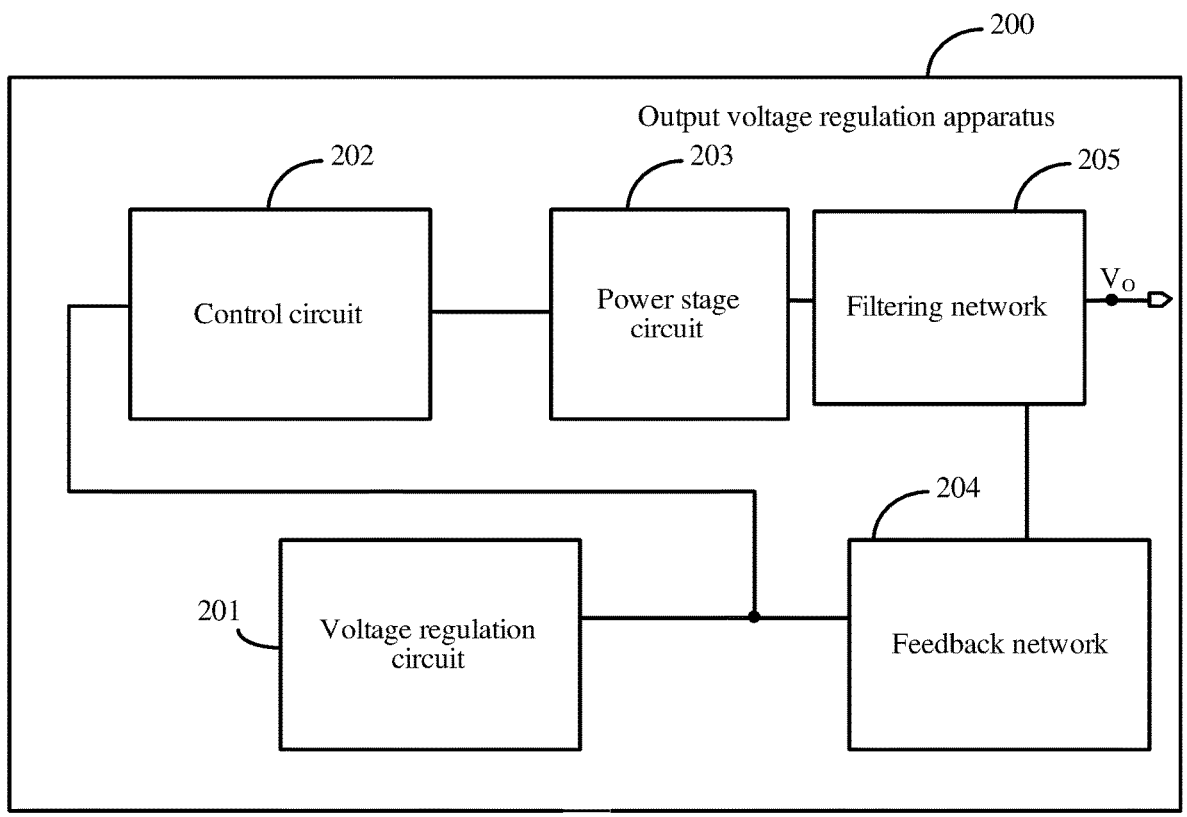
FIG. 2 is a first schematic structural diagram of an output voltage regulation apparatus according to an embodiment of this application.

As shown in FIG. 2, an output voltage regulation apparatus 200 includes a voltage regulation circuit 201, a control circuit 202, a power stage circuit 203, a feedback network 204, and a filtering network 205. The voltage regulation circuit 201, the control circuit 202, the power stage circuit 203, the feedback network 204, and the filtering network 205 form a loop. A specific connection relationship between the circuits is an input end of the feedback network 204 is connected to an output end of the filtering network 205, an output end of the feedback network 204 is connected to the control circuit 202, and is connected to a feedback voltage node of the control circuit 202, an output end of the voltage regulation circuit 201 is connected between the output end of the feedback network 204 and the feedback voltage node of the control circuit 202, an output end of the control circuit 202 is connected to an input end of the power stage circuit 203, and an output end of the power stage circuit 203 is connected to the filtering network 205. Optionally, the filtering network includes an inductor L and a capacitor C. An output signal of the output end of the filtering network 205 is an output voltage $V_O$.

The feedback network 204 is configured to acquire the output voltage $V_O$ of the filtering network 205, and output a feedback voltage to the feedback voltage node of the control circuit 202.

The voltage regulation circuit 201 is configured to regulate a current I of the feedback voltage node of the control circuit 202.

The control circuit 202 is configured to regulate an output duty cycle of the power stage circuit 203 based on the current I of the feedback voltage node of the control circuit 202.

The filtering network 205 is configured to perform filtering on the output duty cycle of the power stage circuit 203, to obtain a regulated output voltage $V_O$.

Optionally, the voltage regulation circuit 201 injects a current to or draws a current from the feedback voltage node of the control circuit 202, to regulate the current I of the feedback voltage node of the control circuit 202. When the current I of the feedback voltage node changes, a value of the output voltage $V_O$ may be affected. In this embodiment of this application, the output voltage $V_O$ is rapidly regulated by rapidly regulating the current I of the feedback voltage node. The drawing a current indicates receiving a current flowing out, in other words, the voltage regulation circuit 201 receives a current flowing out of the feedback voltage node.

Figure 3:
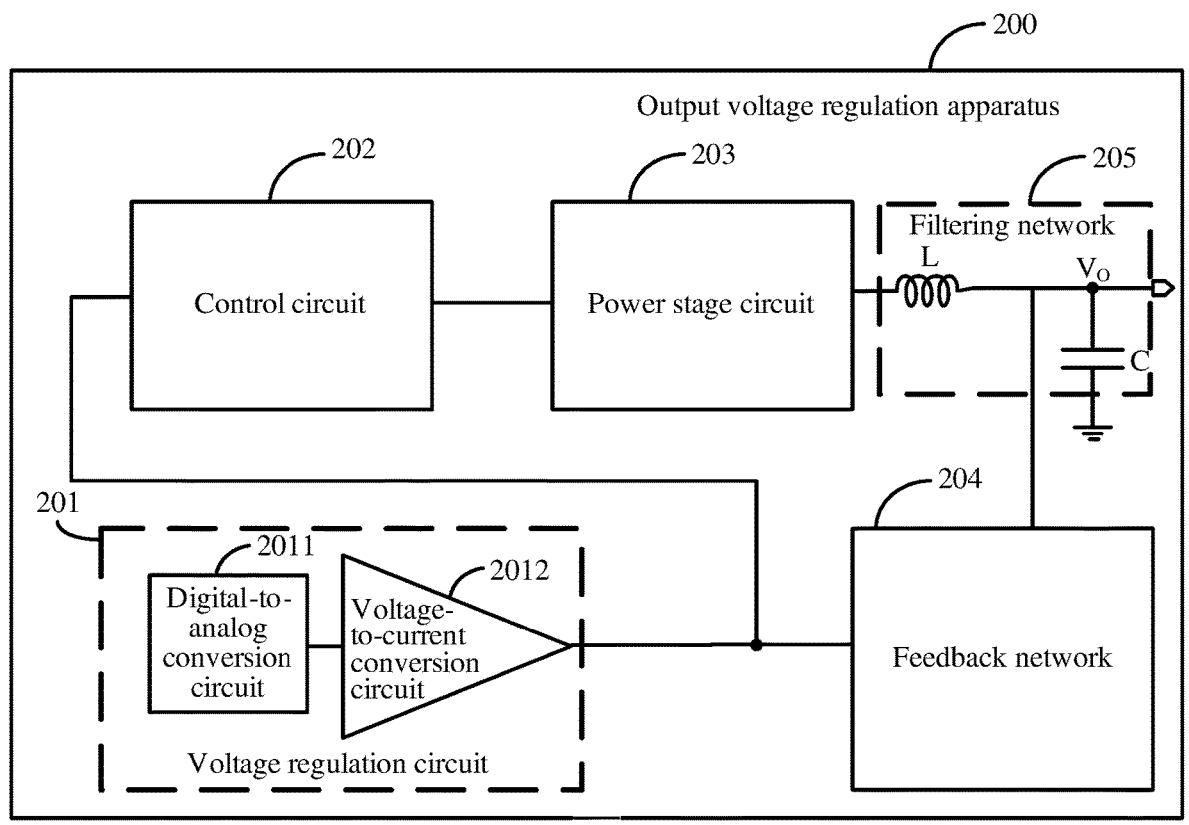
FIG. 3 is a second schematic structural diagram of an output voltage regulation apparatus according to an embodiment of this application.

Optionally, as shown in FIG. 3, the voltage regulation circuit 201 includes a digital-to-analog conversion circuit 2011 and a voltage-to-current conversion circuit 2012.

When the output voltage $V_O$ needs to be regulated, the voltage regulation circuit 201 generates a digital signal for voltage regulation, and the digital signal represents information of the voltage regulation, such as an amplitude. The digital-to-analog conversion circuit 2011 is configured to receive the digital signal used to represent the voltage regulation, generate a first reference voltage signal based on the digital signal, and transmit the first reference voltage signal to the voltage-to-current conversion circuit 2012.

The voltage-to-current conversion circuit 2012 is configured to receive the first reference voltage signal, convert the first reference voltage signal to a current regulation signal, and transmit the current regulation signal to the feedback voltage node. The current regulation signal includes injecting a current to or drawing a current from the feedback voltage node. Optionally, the voltage regulation circuit 201 is further configured to inject a current to the feedback voltage node or receive a current flowing out of the feedback voltage node, based on the current regulation signal.

Optionally, the digital signal for the voltage regulation is a code value S<7:0> for the voltage regulation. When the output voltage $V_O$ needs to be regulated from $V_O1$ to $V_O2$, the voltage regulation circuit 201 generates the code value S<7:0> for the voltage regulation based on a requirement. After passing through the digital-to-analog conversion circuit (DAC) 2011, the code value S<7:0> for the voltage regulation is converted to the first reference voltage signal which may be denoted as $V_{REF\_DAC}$. $V_{REF\_DAC}$ is transmitted to the voltage-to-current conversion circuit 2012 and is converted to the current regulation signal. The current regulation signal may be used to inject a current to or draw a current from the feedback voltage node, and it needs to be determined based on the code value S<7:0> for the voltage regulation whether to inject a current or draw a current.

Figure 4:
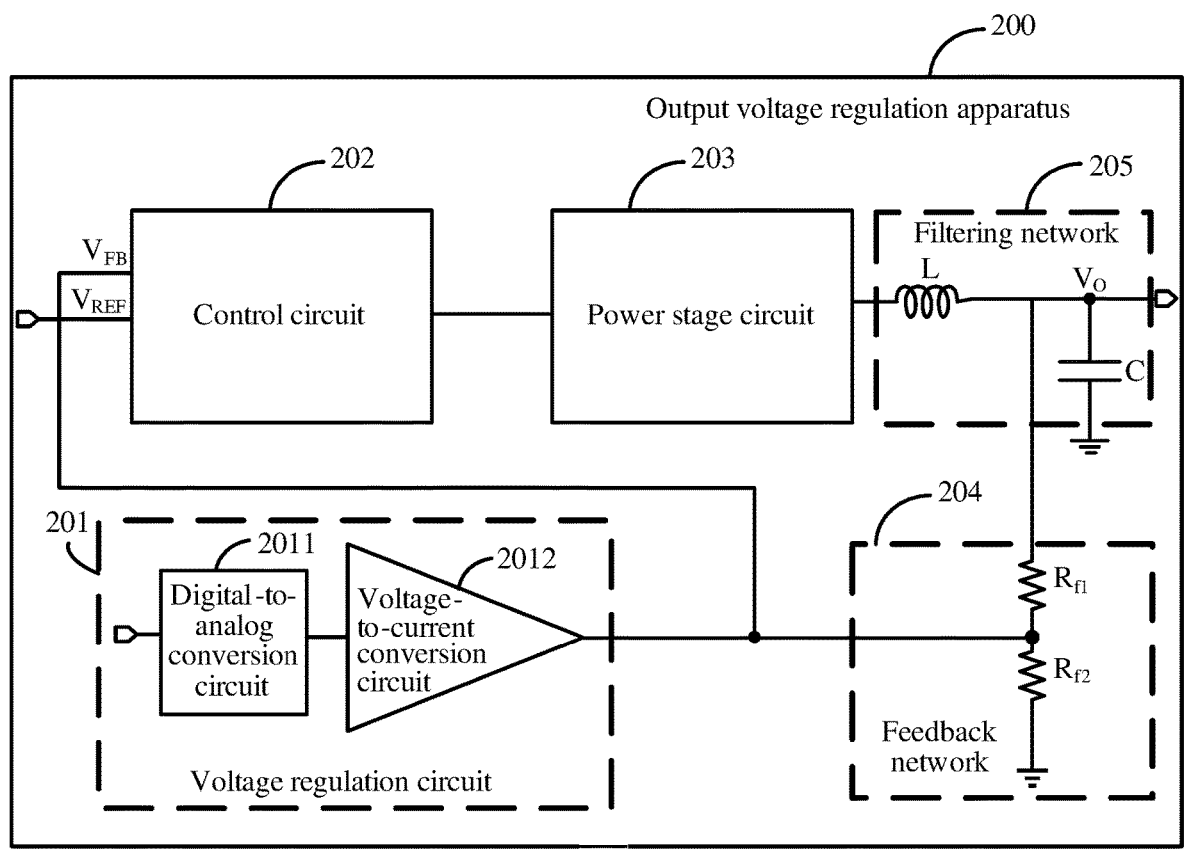
FIG. 4 is a third schematic structural diagram of an output voltage regulation apparatus according to an embodiment of this application.

Optionally, as shown in FIG. 4, the feedback network 204 includes a first feedback resistor $R_{f1}$ and a second feedback resistor $R_{f2}$, and an output point of the feedback network 204 is located between the first feedback resistor $R_{f1}$ and the second feedback resistor $R_{f2}$.

The output voltage $V_O$ and the current I of the feedback voltage node satisfy the following relationship.

$$V_O = V_{REF}*(1+R_{f1}/R_{f2}) + I*R_{f1} \quad \text{formula (1), where}$$

$V_{REF}$ is a second reference voltage signal obtained by the control circuit 202.

Figure 5:
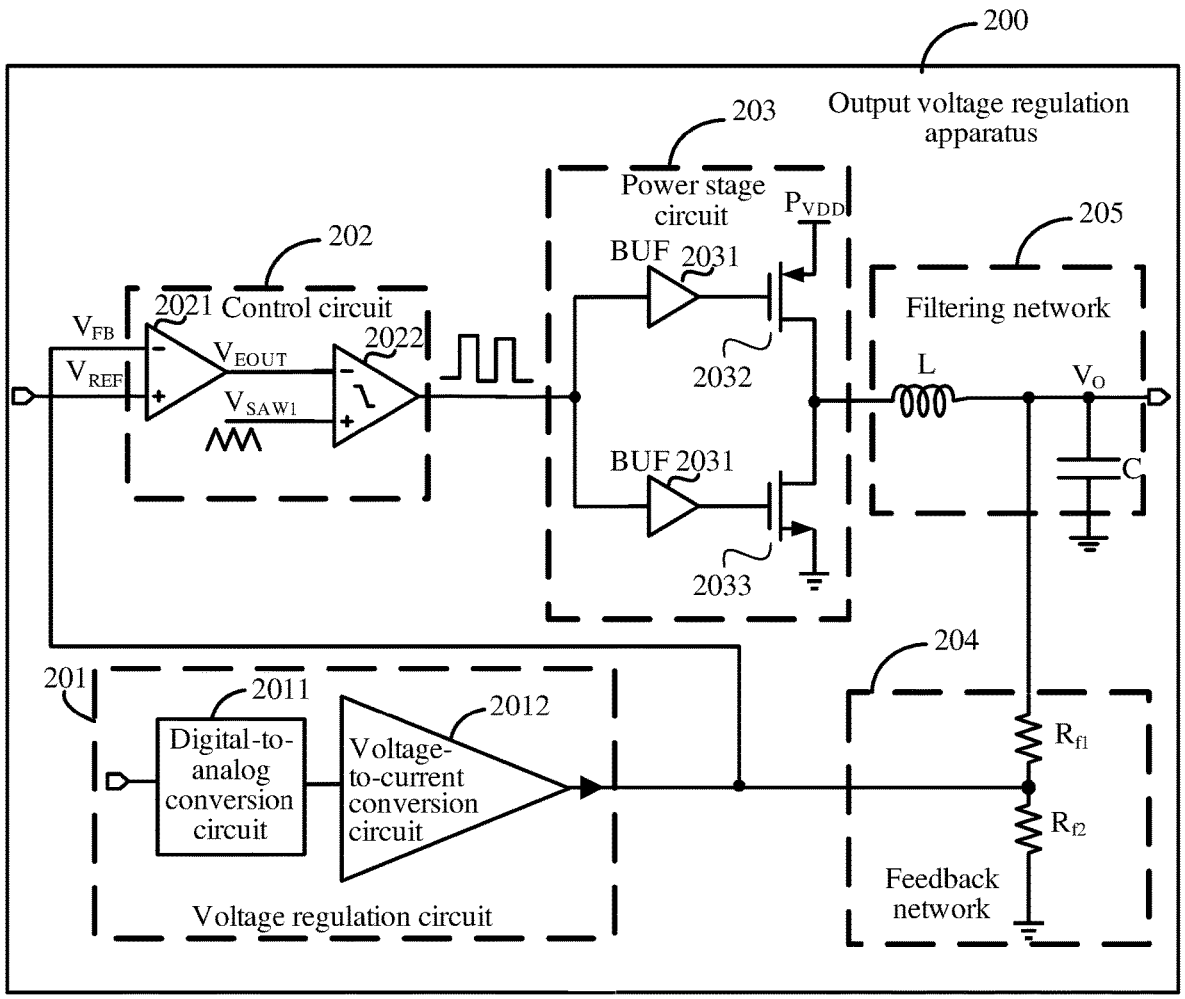
FIG. 5 is a fourth schematic structural diagram of an output voltage regulation apparatus according to an embodiment of this application.

As shown in FIG. 5, in a possible implementation, specific structures of the control circuit 202 and the power stage circuit 203 are described as follows.

The control circuit 202 includes an error amplifier 2021 and a comparator 2022. The power stage circuit 203 includes a driver stage BUF 2031, an upper power transistor 2032, and a lower power transistor 2033.

The error amplifier 2021 outputs a $V_{EAOUT}$ signal after performing error amplification on the feedback voltage $V_{FB}$ that is output by the feedback network 204 and the second reference voltage signal $V_{REF}$. After the $V_{EAOUT}$ signal and a triangular wave signal $V_{SAW1}$ pass through the comparator 2022, a duty cycle square wave signal is output, and the duty cycle square wave signal is used to switch on or off the power stage circuit 203. The voltage regulation circuit 201 injects a current to or draws a current from the feedback voltage node using the current regulation signal, to regulate a value of the feedback voltage $V_{FB}$.

The power stage circuit 203 switches on or off the power transistors based on the duty cycle square wave signal that is output by the comparator 2022, and further outputs energy of a PVDD as the output voltage $V_O$.

A Kirchhoff equation of the feedback voltage $V_{FB}$ node is as follows.

$$\frac{V_{FB}}{R_{f2}} + I - \frac{V_O - V_{FB}}{R_{f1}} = 0 \quad \text{formula (2)}$$

$V_{FB}$ and $V_{REF}$ of two input ends of the error amplifier 2021 have the following relationship.

$$V_{FB} = V_{REF} \quad \text{formula (3)}$$

The formula (1) may be deduced using the formula (2) and the formula (3).

When a direction of the current I is flowing into the feedback voltage $V_{FB}$ node, a value of I is positive. When a direction of the current I is flowing out of the feedback voltage $V_{FB}$ node, a value of I is negative, that is, a current whose magnitude is an absolute value of I is drawn from the feedback voltage $V_{FB}$ node. In the formula (1), the value of $V_O$ equals $V_{REF}*(1+R_{f1}/R_{f2})$ minus a product of the absolute value of I and $R_{f1}$.

The voltage regulation circuit 201 includes a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Based on a same inventive concept as that of the output voltage regulation apparatus shown in FIG. 2, an embodiment of this application further provides an output voltage regulation method. On a basis of maintaining a reference voltage $V_{REF}$ in a control circuit unchanged, a current of a feedback voltage $V_{FB}$ node in the control circuit is changed, to rapidly regulate an output voltage $V_O$. In this way, not only rapid regulation of the output voltage can be implemented, but also an overshoot, an undershoot, or a glitch that occurs in an output voltage regulation process can be inhibited, and a time of regulating the output voltage to a regulated voltage is effectively shortened.

The specific method is as follows. An output voltage $V_O$ of a power stage circuit is acquired and a feedback voltage is output to a feedback voltage node of the control circuit using a feedback network, a current I of the feedback voltage node is regulated using a voltage regulation circuit, to change the output feedback voltage, and the output voltage $V_O$ of the power stage circuit is regulated based on the current I of the feedback voltage node using the control circuit. The output voltage $V_O$ is rapidly regulated by regulating the current of the feedback node, providing an excellent inhibition effect on an overshoot, an undershoot, or a glitch of the output voltage such that a voltage regulation effect is more rapidly and stably achieved.

Optionally, the regulating a current I of the feedback voltage node using a voltage regulation circuit is receiving a digital signal used to represent voltage regulation, generating a first reference voltage signal based on the digital signal, converting the first reference voltage signal to a current regulation signal, and transmitting the current regulation signal to the feedback voltage node.

Optionally, the regulating a current I of the feedback voltage node using a voltage regulation circuit is injecting a current to the feedback voltage node or receiving a current flowing out of the feedback voltage node, based on the current regulation signal.

Optionally, the output voltage $V_O$ and the current I of the feedback voltage node satisfy the following relationship, $V_O=V_{REF}*(1+R_{f1}/R_{f2})+I*R_{f1}$, where $V_{REF}$ is a second reference voltage signal obtained by the control circuit, $R_{f1}$ is a first feedback resistor in the feedback network, $R_{f2}$ is a second feedback resistor in the feedback network, and an output point of the feedback network is located between the first feedback resistor and the second feedback resistor.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read only memory (CD-ROM), an optical memory, and the like) that include computer usable program code.

This application is described with reference to the flowcharts and/or block diagrams of the method, the device or system, and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine such that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can instruct the computer or another programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

The invention claimed is:

1. An output voltage regulation apparatus, comprising:
a control circuit;
a power stage circuit;
a filtering network;
a feedback network, wherein an input end of the feedback network is coupled to an output end of the filtering network, wherein the input end of the feedback network is configured to acquire a regulated output voltage of the filtering network, wherein an output end of the feedback network is coupled to a feedback voltage node of the control circuit, and wherein the output end of the feedback network is configured to output a feedback voltage to the feedback voltage node of the control circuit; and
a voltage regulation circuit configured to output a current regulation signal used to inject a current to the feedback voltage node or receive a current flowing out of the feedback voltage node, wherein an output end of the voltage regulation circuit is coupled between the output end of the feedback network and the feedback voltage node of the control circuit,
wherein the control circuit is configured to:
receive the feedback voltage; and
switch on or off power transistors in the power stage circuit, and
wherein the filtering network is configured to perform filtering on an output voltage of the power stage circuit to obtain the regulated output voltage.

2. The output voltage regulation apparatus according to claim 1, wherein the voltage regulation circuit comprises a digital-to-analog conversion circuit and a voltage-to-current conversion circuit, wherein the digital-to-analog conversion circuit is configured to:
receive a digital signal used to represent voltage regulation;
generate a first reference voltage signal based on the digital signal; and
transmit the first reference voltage signal to the voltage-to-current conversion circuit, and
wherein the voltage-to-current conversion circuit is configured to:
receive the first reference voltage signal;
convert the first reference voltage signal to the current regulation signal; and
transmit the current regulation signal to the feedback voltage node.

3. The output voltage regulation apparatus according to claim 1, wherein the feedback network comprises a first feedback resistor and a second feedback resistor, and wherein an output point of the feedback network is located between the first feedback resistor and the second feedback resistor.

4. The output voltage regulation apparatus according to claim 1, wherein the control circuit is configured to output a duty cycle square wave signal to switch on or off the power transistors in the power stage circuit.

5. The output voltage regulation apparatus according to claim 4, wherein the control circuit comprises:
an error amplifier configured to perform error amplification on the feedback voltage and a first reference voltage signal to output an output signal; and
a comparator configured to compare the output signal and a triangular wave signal to output the duty cycle square wave signal.

6. The output voltage regulation apparatus according to claim 4, wherein the power stage circuit comprises an upper power transistor and a lower power transistor, and wherein the duty cycle square wave signal is used to switch on or off the upper power transistor and the lower power transistor.

7. The output voltage regulation apparatus according to claim 6, wherein the power stage circuit further comprises a driver stage, and wherein the driver stage is coupled to the upper power transistor and the lower power transistor and configured to receive the duty cycle square wave signal.

8. The output voltage regulation apparatus according to claim 1, wherein the filtering network comprises an inductor and a capacitor.

9. An output voltage regulation method, comprising:
acquiring a regulated output voltage of a filtering network;
outputting a feedback voltage to a feedback voltage node of a control circuit using a feedback network;
outputting a current regulation signal using a voltage regulation circuit, wherein the current regulation signal is used to inject a current to the feedback voltage node or receive a current flowing out of the feedback voltage node;
switching on or off power transistors in a power stage circuit using the control circuit; and
performing filtering on an output voltage of the power stage circuit using the filtering network to obtain the regulated output voltage.

10. The method according to claim 9, wherein outputting the current regulation signal comprises:
receiving a digital signal representing voltage regulation;
generating a first reference voltage signal based on the digital signal using a digital-to-analog conversion circuit;
converting the first reference voltage signal to the current regulation signal; and
transmitting the current regulation signal to the feedback voltage node using a voltage-to-current conversion circuit.

11. The method according to claim 9, wherein the feedback network comprises a first feedback resistor and a second feedback resistor, and wherein an output point of the feedback network is located between the first feedback resistor and the second feedback resistor.

12. The method according to claim 9, wherein switching on or off the power transistors in the power stage circuit comprises outputting a duty cycle square wave signal to switch on or off the power transistors in the power stage circuit.

13. The method according to claim 12, wherein outputting the duty cycle square wave signal comprises:
performing error amplification on the feedback voltage and a first reference voltage signal to output an output signal; and
comparing the output signal and a triangular wave signal to output the duty cycle square wave signal.

14. The method according to claim 12, wherein the power stage circuit comprises an upper power transistor and a lower power transistor, and wherein the duty cycle square wave signal is used to switch on or off the upper power transistor and the lower power transistor.

15. The method according to claim 14, wherein the power stage circuit further comprises a driver stage which is coupled to the upper power transistor and the lower power transistor, and wherein switching on or off the power transistors in the power stage circuit further comprises receiving the duty cycle square wave signal using the driver stage.

16. The method according to claim 9, wherein the filtering network comprises an inductor and a capacitor.

17. A power supply, comprising an output voltage regulation apparatus, the apparatus comprising:
a control circuit;
a power stage circuit;
a filtering network;
a feedback network, wherein an input end of the feedback network is coupled to an output end of the filtering network, wherein the input end of the feedback network is configured to acquire a regulated output voltage of the filtering network, wherein an output end of the feedback network is coupled to a feedback voltage node of the control circuit, and wherein the output end of the feedback network is configured to output a feedback voltage to the feedback voltage node of the control circuit; and
a voltage regulation circuit configured to output a current regulation signal used to inject a current to the feedback voltage node or receive a current flowing out of the feedback voltage node, wherein an output end of the voltage regulation circuit is coupled between the output end of the feedback network and the feedback voltage node of the control circuit,
wherein the control circuit is configured to:
receive the feedback voltage; and
switch on or off power transistors in the power stage circuit, and
wherein the filtering network is configured to perform filtering on an output voltage of the power stage circuit to obtain the regulated output voltage.

18. The output voltage regulation apparatus according to claim 17, wherein the voltage regulation circuit comprises a digital-to-analog conversion circuit and a voltage-to-current conversion circuit, wherein the digital-to-analog conversion circuit is configured to:
receive a digital signal used to represent voltage regulation;
generate a first reference voltage signal based on the digital signal; and
transmit the first reference voltage signal to the voltage-to-current conversion circuit, and
wherein the voltage-to-current conversion circuit is configured to:
receive the first reference voltage signal;
convert the first reference voltage signal to the current regulation signal; and
transmit the current regulation signal to the feedback voltage node.

19. The output voltage regulation apparatus according to claim 17, wherein the feedback network comprises a first feedback resistor and a second feedback resistor, and wherein an output point of the feedback network is located between the first feedback resistor and the second feedback resistor.

20. The output voltage regulation apparatus according to claim 17, wherein the control circuit is configured to output a duty cycle square wave signal to switch on or off the power transistors in the power stage circuit.

* * * * *